United States Patent
Stapleton

(10) Patent No.: US 9,039,382 B2
(45) Date of Patent: May 26, 2015

(54) BLADE SKIRT

(75) Inventor: David Scott Stapleton, Boston, MA (US)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 13/306,413

(22) Filed: Nov. 29, 2011

(65) Prior Publication Data

US 2013/0136618 A1    May 30, 2013

(51) Int. Cl.
  *F01D 5/14*    (2006.01)
  *F01D 5/30*    (2006.01)

(52) U.S. Cl.
  CPC .......... *F01D 5/3015* (2013.01); *F05D 2240/80* (2013.01); *F05D 2250/70* (2013.01); *Y02T 50/671* (2013.01)

(58) Field of Classification Search
  CPC ................................. F01D 5/30; F01D 5/3015
  USPC ...... 416/193 A, 219 A, 219 R, 220 A, 220 R, 416/239, 248, 500
  See application file for complete search history.

(56) References Cited

U.S. PATENT DOCUMENTS

| | | | |
|---|---|---|---|
| 4,470,756 A | 9/1984 | Rigo et al. | |
| 4,480,958 A | 11/1984 | Schlechtweg | |
| 5,183,389 A | 2/1993 | Gilchrist et al. | |
| 5,257,909 A | 11/1993 | Glynn et al. | |
| 5,261,790 A | 11/1993 | Dietz et al. | |
| 5,302,085 A | 4/1994 | Dietz et al. | |
| 5,302,086 A | 4/1994 | Kulesa et al. | |
| 5,369,882 A | 12/1994 | Dietz et al. | |
| 6,354,803 B1 | 3/2002 | Grover et al. | |
| 6,769,865 B2 | 8/2004 | Kress et al. | |
| 6,857,853 B1 * | 2/2005 | Tomberg et al. | 416/192 |
| 6,923,616 B2 | 8/2005 | McRae, Jr. et al. | |
| 6,984,112 B2 | 1/2006 | Zhang et al. | |
| 7,090,466 B2 | 8/2006 | Honkomp et al. | |
| 7,097,429 B2 | 8/2006 | Athans et al. | |
| 7,131,817 B2 | 11/2006 | Keith et al. | |
| 7,144,215 B2 | 12/2006 | Keith et al. | |

(Continued)

FOREIGN PATENT DOCUMENTS

CN    1580496 A    2/2005
CN  101787903 A    7/2010

(Continued)

OTHER PUBLICATIONS

EP Search Report and Written Opinion issued May 14, 2014 in connection with corresponding EP Patent Application No. 12194394.8.

(Continued)

*Primary Examiner* — Edward Look
*Assistant Examiner* — Christopher R Legendre
(74) *Attorney, Agent, or Firm* — General Electric Company; William Scott Andes

(57) ABSTRACT

A blade of a gas turbine engine is provided having an airfoil, a platform, a shank, a dovetail, and a skirt. The airfoil may extend distally from the platform, and the shank may extend proximally from the platform. The dovetail may also be provided to extend proximally from the shank. The skirt may be disposed on an aft side of the shank and may extend from the shank in a direction at least partially axially aft from the shank.

18 Claims, 9 Drawing Sheets

(56) References Cited

U.S. PATENT DOCUMENTS

| | | | |
|---|---|---|---|
| 7,147,440 B2 | 12/2006 | Benjamin et al. | |
| 7,189,063 B2 | 3/2007 | Honkomp | |
| 7,198,467 B2 | 4/2007 | Keith et al. | |
| 7,207,776 B2* | 4/2007 | Townes et al. | 416/95 |
| 7,238,008 B2 | 7/2007 | Bobo et al. | |
| 7,244,101 B2* | 7/2007 | Lee et al. | 416/97 R |
| 7,322,797 B2 | 1/2008 | Lee et al. | |
| 7,600,972 B2 | 10/2009 | Benjamin et al. | |
| 7,731,482 B2* | 6/2010 | Lagrange et al. | 416/190 |
| 7,766,621 B1* | 8/2010 | Maggs et al. | 416/193 A |
| 8,083,475 B2* | 12/2011 | Bulgrin et al. | 415/173.7 |
| 8,573,942 B2* | 11/2013 | Strohl et al. | 416/219 R |
| 2008/0181779 A1* | 7/2008 | Decardenas | 416/219 R |
| 2010/0129226 A1* | 5/2010 | Strohl et al. | 416/219 R |
| 2010/0178173 A1* | 7/2010 | Charlton | 416/248 |
| 2013/0136618 A1* | 5/2013 | Stapleton | 416/235 |
| 2014/0294587 A1* | 10/2014 | Dupeyre et al. | 416/193 A |

FOREIGN PATENT DOCUMENTS

| | | |
|---|---|---|
| EP | 0091865 A1 | 10/1983 |
| EP | 2053285 A1 | 4/2009 |
| JP | 2009243427 A | 10/2009 |

OTHER PUBLICATIONS

Unofficial English Translation of the Retrieval Report from the State Intellectual Property Office of the People's Republic of China, application No. 201210493673.6 dated Mar. 7, 2015.

* cited by examiner

BLADE SKIRT

TECHNICAL FIELD

This invention pertains to gas turbine engines and particularly to blades therein.

BACKGROUND

Weight restrictions are always an important consideration when designing and developing aircraft and their associated components. The disclosed embodiments of the present invention relate to gas turbine engine blades.

SUMMARY

A first embodiment of the present invention provides a turbine engine blade having a proximal end and a radially distal end. The blade is provided with an airfoil, a platform, a shank, a dovetail, and a skirt. The airfoil may extend distally from the platform, and the shank may extend proximally from the platform. The dovetail may also be provided to extend proximally from the shank. The skirt may be disposed on an aft side of the shank and may extend from the shank in a direction at least partially axially aft from the shank.

BRIEF DESCRIPTION OF THE DRAWINGS

Embodiments of the invention are illustrated in the following illustrations.

DETAILED DESCRIPTION

A typical gas turbine engine generally possesses a forward end and an aft end with its several components following inline therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, high-pressure and low-pressure turbines, and an external shaft. This, however, is not an exhaustive list. An engine also typically has an internal shaft axially disposed through a center longitudinal axis of the engine. The internal shaft is connected to both the turbine and the air compressor, such that the turbine provides a rotational input to the air compressor to drive the compressor blades. A typical gas turbine engine may also be considered to have an outer circumference with a central longitudinal axis therethrough.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Figure 1:
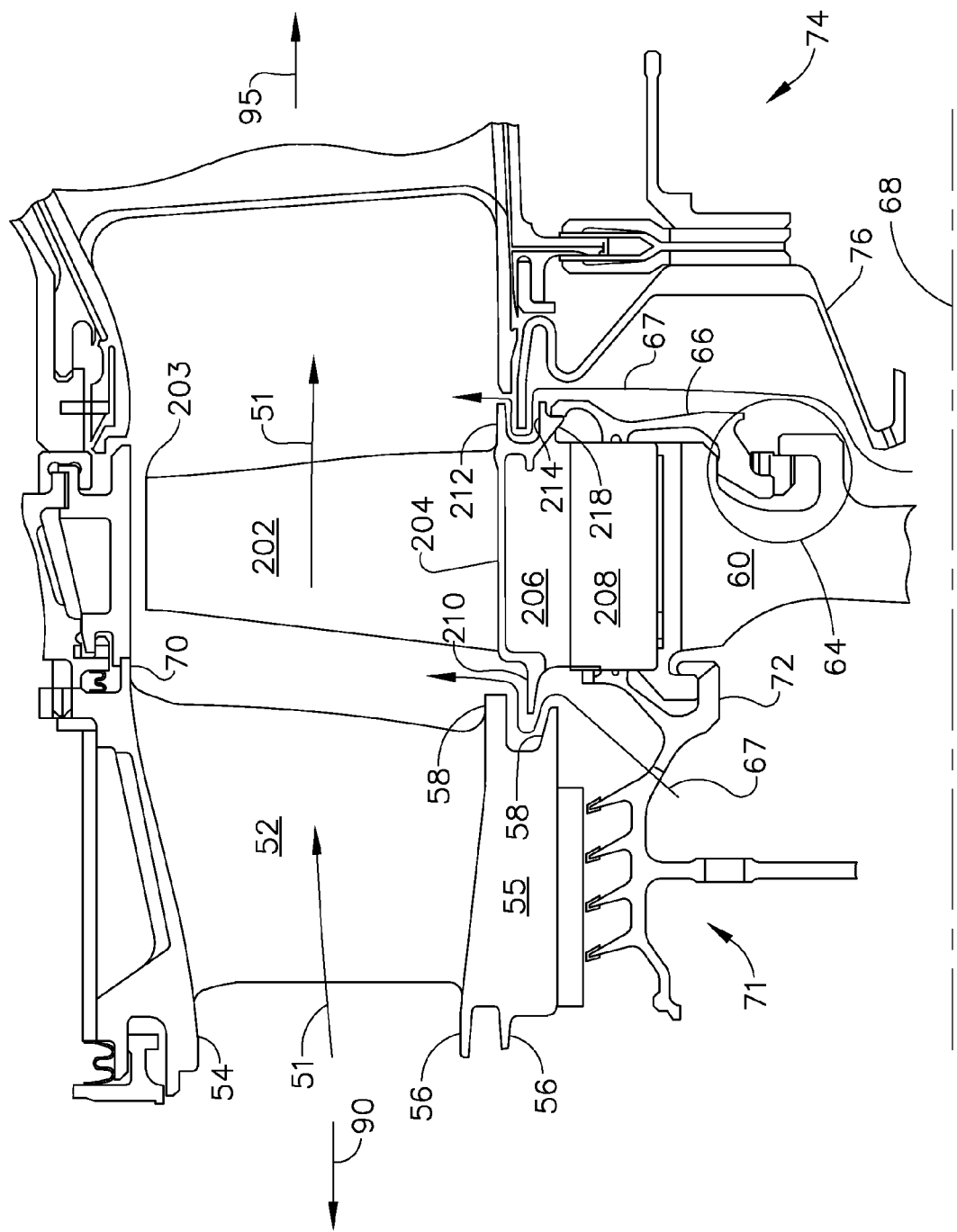
FIG. 1 is a side cross-sectional view, taken along a plane coinciding with a longitudinal axis of a gas turbine engine, of a portion of a turbine section of the gas turbine engine.

Referring to FIG. 1, a cross-section of a portion of a turbine section of a gas turbine engine is shown with a turbine blade 200 provided with an embodiment of an aft blade skirt 218. The portion of the shown turbine section is a part of a two-stage high pressure turbine. The turbine is disposed axially aft of the engine combustor 90, and axially forward of the engine nozzle 95. The shown turbine blade 200 is an embodiment of a second stage turbine blade 200, and a plurality of these turbine blades 200 are circumferentially disposed in a row about a radially distal section of a circular rotor 60. However, only one turbine blade 200 is shown in this cross-section.

The turbine blade 200 is provided with an airfoil 202, a platform 204, a shank 206, and a fir-tree shaped dovetail 208. The airfoil 202 extends from the platform 204 radially distally and terminates in a blade tip 203. The shank 206 extends radially proximally from the platform 204, and the dovetail 208 extends radially proximally from the shank 206. The turbine blade 200 attaches to a rotor 60 via the dovetail 208. The blade 200 is secured to the rotor 60 via contact between an embodiment of a blade aft skirt 218 and a retainer 66, both of which are disposed on the aft side of the blade 200 and rotor 60, respectively. The retainer 66 may be fixed to the rotor 60 via a lock ring and rabbet assembly 64.

Forward of the turbine blade 200, a plurality of nozzles 52 are circumferentially disposed. However, only one nozzle 52 is shown in this cross-section. The nozzle 52 may also be referred to as a stator airfoil or stator vane. Each nozzle 52 is secured to a stator case assembly 70, which defines a radially distal boundary of the gas flow 51 through the turbine, via a stator outer band 54. The nozzle 52 is provided with a stator inner band 55 radially proximal of the stator outer band 54, meaning it is closer to a longitudinal axis 68 disposed through the gas turbine engine. Forward overlap bands 56 and aft overlap bands 58 are disposed on the stator inner band 55. The aft overlap bands 58 overlap with the turbine forward angel wing 210. The forward overlap bands 56 overlap with an aft angel wing of a forward turbine blade (not shown).

A mid seal assembly 71 is also provided forward of the turbine blade 200, which rotates with the rotor 60. The mid seal assembly 71 is provided with a retainer 72 for securing the turbine blade 200 on a forward side of the rotor 60 as well as securing the mid seal assembly 71 to the rotor 60.

A first stage turbine blade assembly (not shown) may be provided forward of the nozzle 52, and forward of and connected to the mid seal assembly 71.

An inner stator assembly 74 may be disposed aft of the turbine blade 200. This stator assembly 74 may be provided with a z-seal 76 that overlaps the turbine aft angel wings 212,214.

Hot combustion gases 51 from the forward combustor 90 flow through an outer annular portion of the turbine section past the nozzles 52 and turbine blades 200, then proceeding on to the engine nozzle 95. The turbine blades 200 and rotor 60 rotate as the hot gases 51 flow past the turbine blades 200. Cooler purge air 67 that has been bled from the compressor (not shown) and bypassed the combustor 90 flows through a center portion of the turbine. The purge air 67 is at a higher pressure than the flow of hot combustion gases 51 and will therefore leak into that flow path 51 via gaps between the nozzles 52 and turbine blades 200. The overlapping interaction between the aft overlap bands 58 and forward angel wing 210, and between the turbine aft angel wings 212,214 and z-seal 76 control this leakage.

FIG. 1 and the preceding text have been provided to describe a possible environment in which a turbine blade 200 provided with an embodiment of a blade skirt 218 of the present invention may be utilized. It is not intended to limit the description of the invention in any way. In addition, the environment and structure surrounding the blade skirt 218 embodiment may change depending on the overall design of the gas turbine engine in which it may be utilized, and where it is disposed within that engine. While the shown blade skirt 218 has been described on a second stage turbine blade 200 in a high pressure turbine, it is to be understood that various embodiments of the skirt may be generally utilized on any blade used in a gas turbine engine. Furthermore, the following description of a turbine blade of the prior art 100 may be considered to exist in a similar surrounding structure as that depicted in FIG. 1 and the preceding description.

Figure 2:
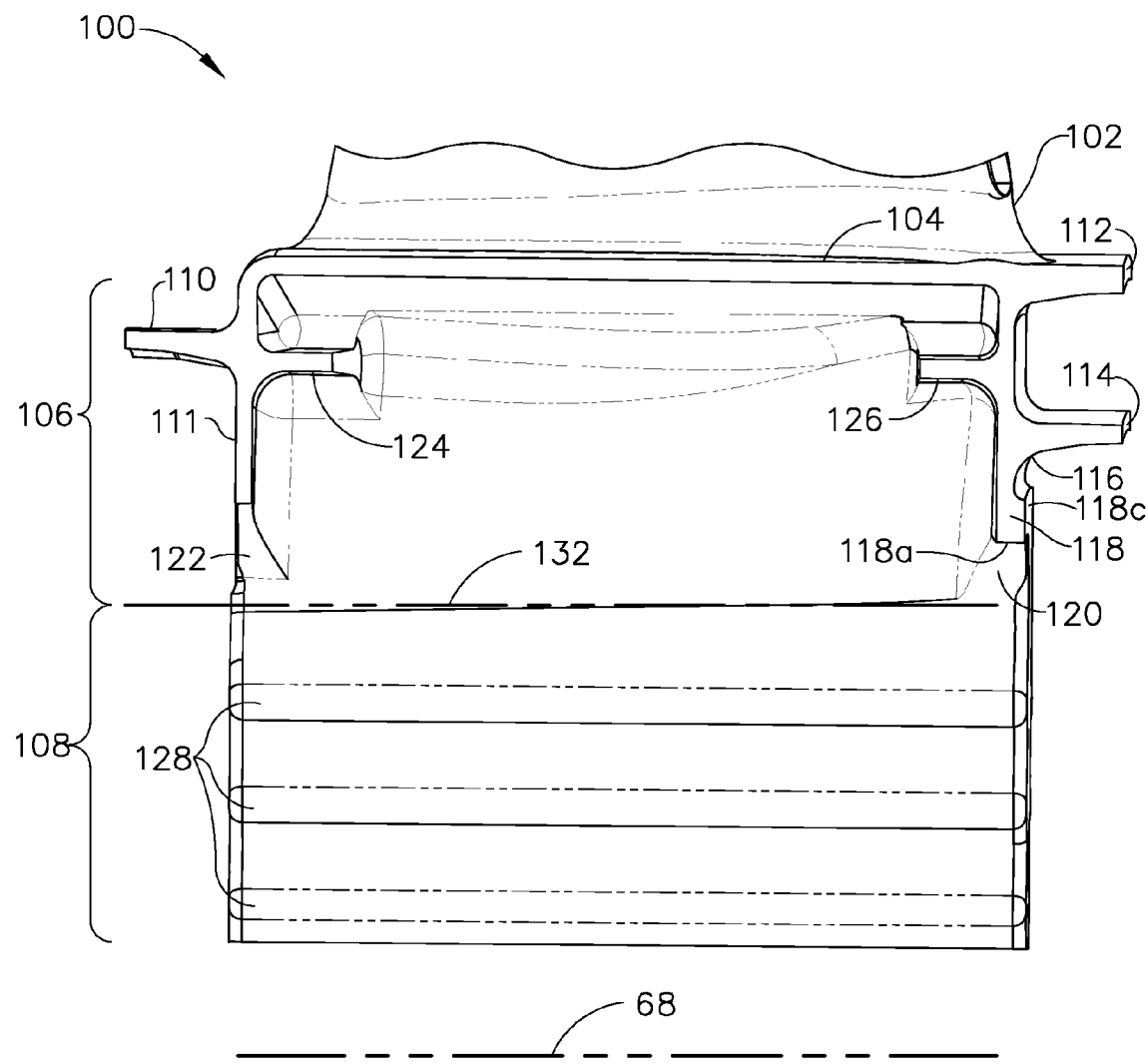
FIG. 2 is a side view of a blade of the prior art.
Figure 3:
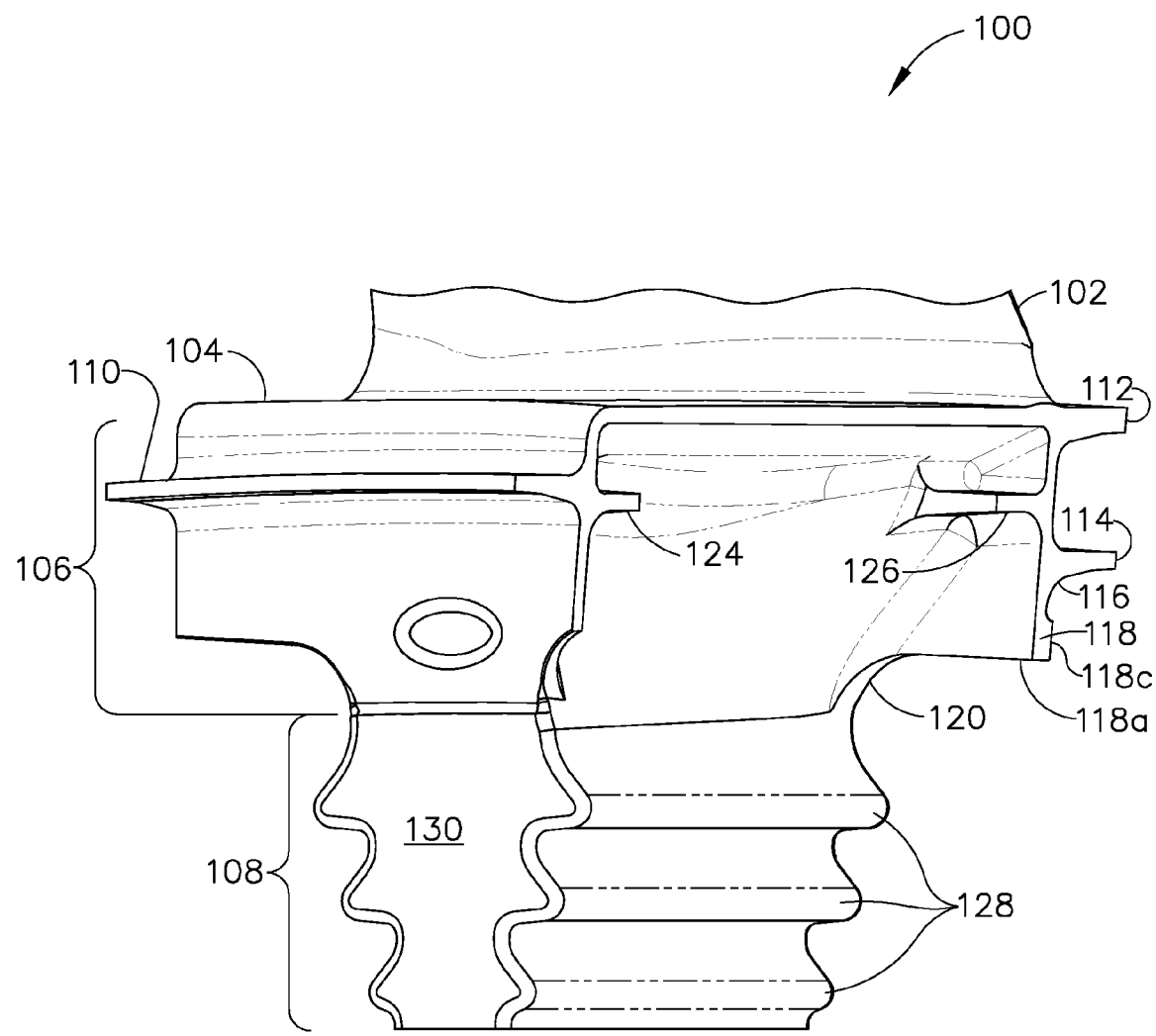
FIG. 3 is a side perspective of the blade depicted in FIG. 2, as viewed from a forward position.
Figure 4:
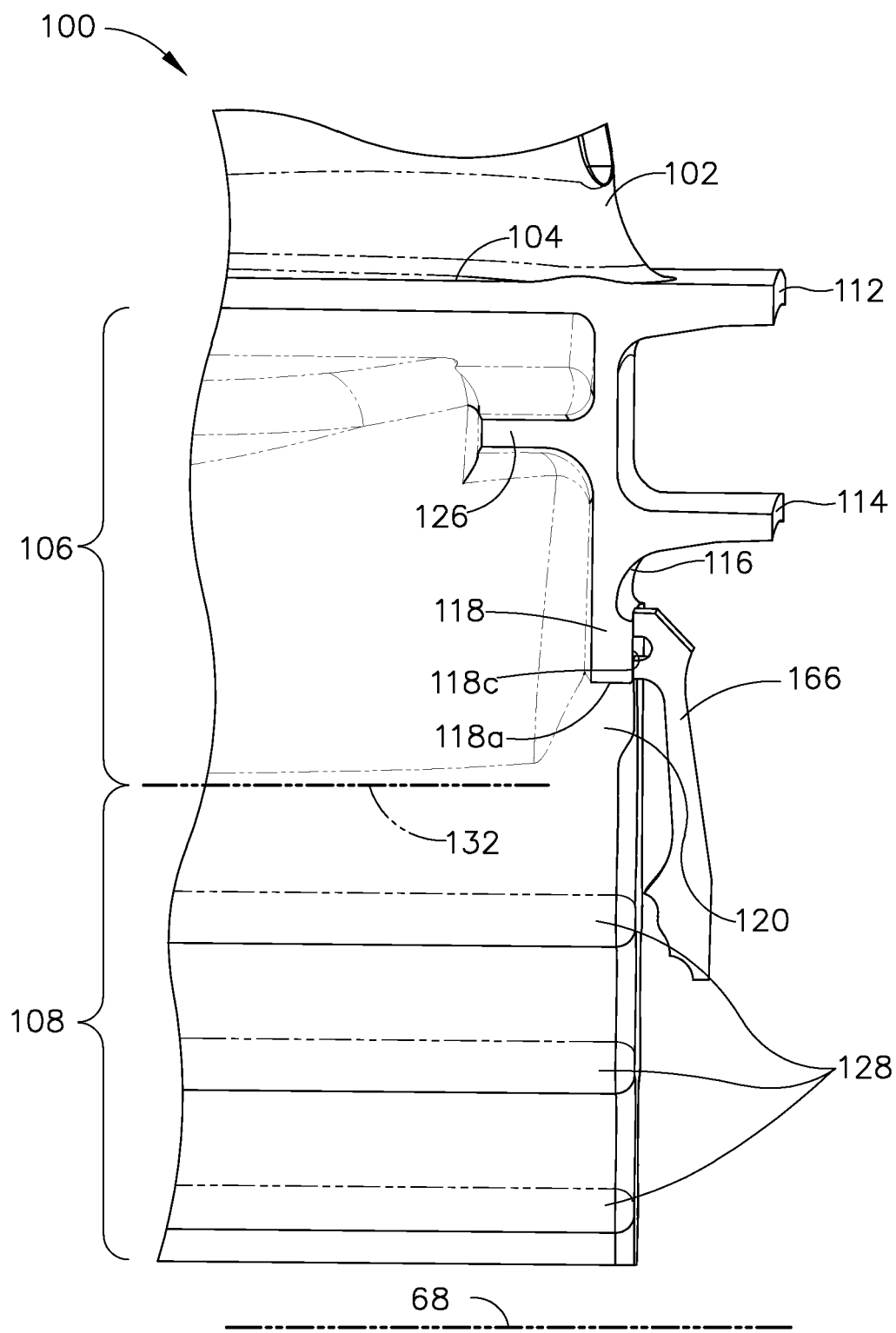
FIG. 4 is a side view of an aft portion of the blade depicted in FIG. 2 with the addition of showing the relative position of a retainer.
Figure 5:
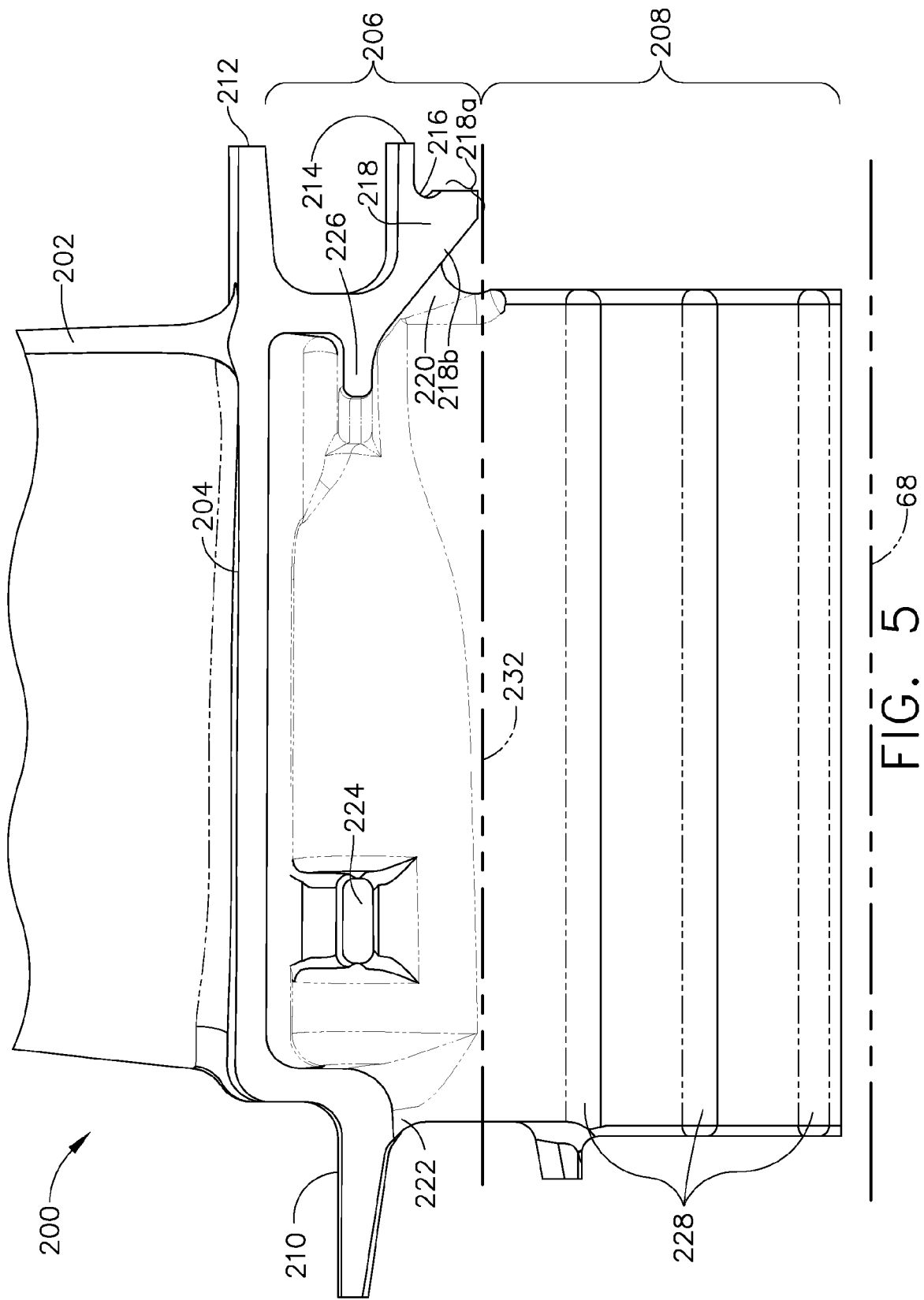
FIG. 5 is a side view of a blade of an embodiment of the present invention.
Figure 6:
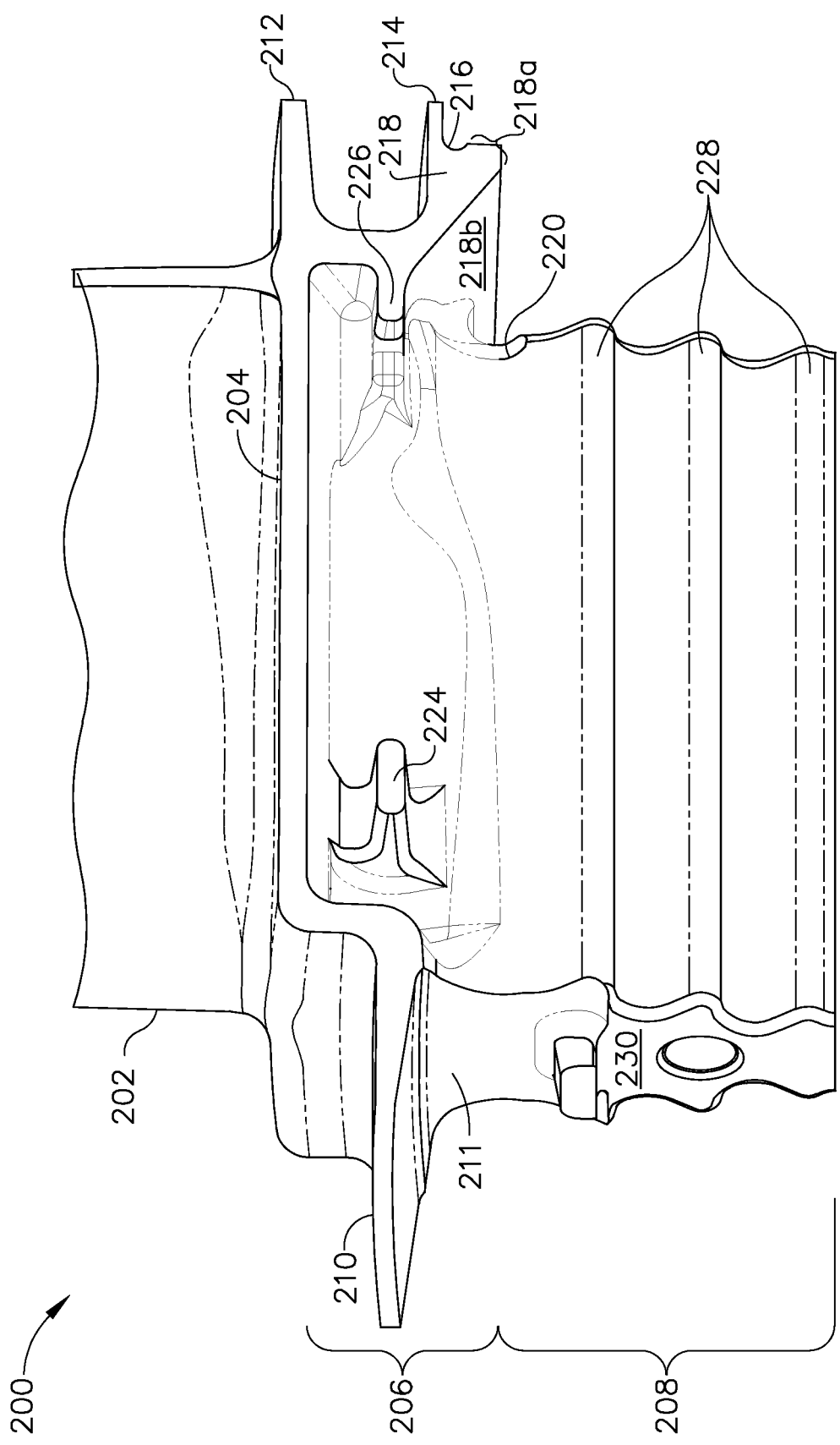
FIG. 6 is a side perspective of the blade depicted in FIG. 5, as viewed from a forward position.

Referring now to FIGS. 2-4, a gas turbine engine blade 100 generally known in the prior art is depicted. A blade 100 of the prior art typically possess a proximal end that mates with a rotor (not shown) and a distal end that terminates at a blade tip (not shown). The proximal end is radially inward of the distal end. Moving from the distal end to the proximal end, a blade 100 typically has an airfoil 102, a platform 104, a shank 106, and a multi-lobe dovetail 108 having a fir tree configuration with multiple dovetail lobes 128. These components are typically integrally joined.

A blade 100 also typically possesses a forward side having a forward surface 130 that faces a stream of hot combustion gases coming from a combustion chamber (not shown) of the engine. Axially opposite from the forward side, the blade has an aft or suction side. On the forward side of the blade 100, there is a forward angel wing 110. The blade forward side may also be provided with a forward skirt 111 extending radially proximal from the forward angel wing 110 and generally blending at 122 with the blade forward surface. On the aft side of the blade 100, there is a distal aft angel wing 112 radially inward of that is a proximal aft angel wing 114 with a gap therebetween. Proximal of the aft proximal angel wing 114, there is a fillet 116 that blends into a skirt 118.

A skirt 118 is disposed on the aft side of the blade 100. The skirt 118 typically extends radially inward or proximally from the proximal aft angel wing 114 and fillet 116 and has a proximal edge 118a disposed distally of the upper minimum neck 132. The skirt 118 also has an aft surface 118c. The skirt 118 extends laterally across the aft side of the blade 100 and generally along an axially fixed plane perpendicular to a longitudinal axis of the engine. The skirt 118, its proximal edge 118a, and its aft surface 118c blend into the shank 106, such that there is one lateral portion of the skirt and another lateral portion of the skirt on either side, or slash face of the shank 106. With this configuration, the skirt aft surface 118c is interrupted by, or coincides with the blade aft surface. Accordingly, the blade aft surface is uninterrupted and generally flat from the tip of the dovetail 108 up to the proximal aft angel wing 114. On either lateral side of the shank 106, the skirt proximal end 118a blends into the shank 106 by a skirt radius 120. A radially proximal end of the skirt radius 120 may terminate at or near an upper minimum neck 132.

A recess may be provided within the shank portion 106 between the forward and aft sides of the blade 100. Within that recess, there is a forward damper retention lug 124 and an aft damper retention lug 126, which are used in conjunction with one another to retain a damper (not shown). Transitioning between the shank 106 and dovetail 108 is an upper minimum neck designated by dashed line 132.

The dovetail section 108 is inserted in a rotor (not shown) such that the dovetail lobes 128 mate with the rotor to radially fix the blade in place. A retainer 166 is fixedly attached to the rotor (not shown) in any known fashion, such as with a lock ring and rabbet feature. The retainer 166 extends radially distal from the rotor and abuts the blade skirt 118 and blade aft surface so as to axially fix the blade along a longitudinal axis 68 of the engine.

Referring now to FIGS. 5-8, an embodiment of a blade 200 of the present invention is depicted. The blade 200 may possess a proximal end that mates with a rotor 60 (See FIG. 1) and a distal end that terminates at an airfoil tip 203 (See FIG. 1). The proximal end is radially inward of the distal end. One embodiment of a blade of the present invention may have an airfoil 202 extending radially distal from a platform 204, and a shank 206 extending radially proximal from the platform 204. A multi-lobe dovetail 208 having a fir tree configuration may extend from the shank 206 and terminate at a radially proximal end of the blade 200. These components may be integrally joined together.

The blade 200 may also possess a forward side. Axially opposite from the forward side, the blade 200 has an aft or suction side. On the forward side of the blade 200, there may be a forward angel wing 210. The blade forward side may also be provided with a forward skirt 211 extending radially proximal from the forward angel wing 210 and generally blending with a blade forward surface 230. On the aft side of the blade 200, there may be a distal aft angel wing 212, and radially inward of that distal aft angel wing 212 may be an aft skirt 218.

The aft skirt 218 may extend axially aft of the shank 206, as well as radially proximally, such that the skirt 218 extends from the shank 206 at an angle and is proud of a blade aft surface 234. A proximal aft angel wing 214 may extend from a radially distal surface of the skirt 218. The proximal aft angel wing 214 and skirt 218 may be considered to be integrally formed, but this is not necessary. There may be a gap between the distal aft angel wing 212 and the proximal aft angel wing 214, which accommodates an overlap with a z-seal 76 (See FIG. 1) that may be aft of the turbine blade 200.

The skirt 218, extending from the shank 206, may terminate at an end 218a that, as described herein, is axially aft of the shank 206 and radially proximal of the proximal aft angel wing 214 and is also axially aft of the aft surface 234 of the blade 200. The skirt end portion 218a and proximal aft angel wing 214 may be separated or, alternatively, blended together by a fillet 216 or other transition surface. The skirt end portion 218a may possess an appropriate geometry for mating with a retainer 66 as general described in FIG. 1.

The skirt 218 may also possess a proximal surface 218b that may extend from the shank 206 at an angle that is axially aft of the shank 206 and blade aft surface 234. A skirt radius 220 may serve as a transitioning surface between the skirt proximal surface 218b and the aft surface 234. Additionally, the skirt radius 220 may also serve as a transitioning surface between the aft surface 234 and a lateral side of the shank 206. The skirt radius 220 may have a radially proximal end near or adjacent to an upper minimum neck 232.

Figure 7:
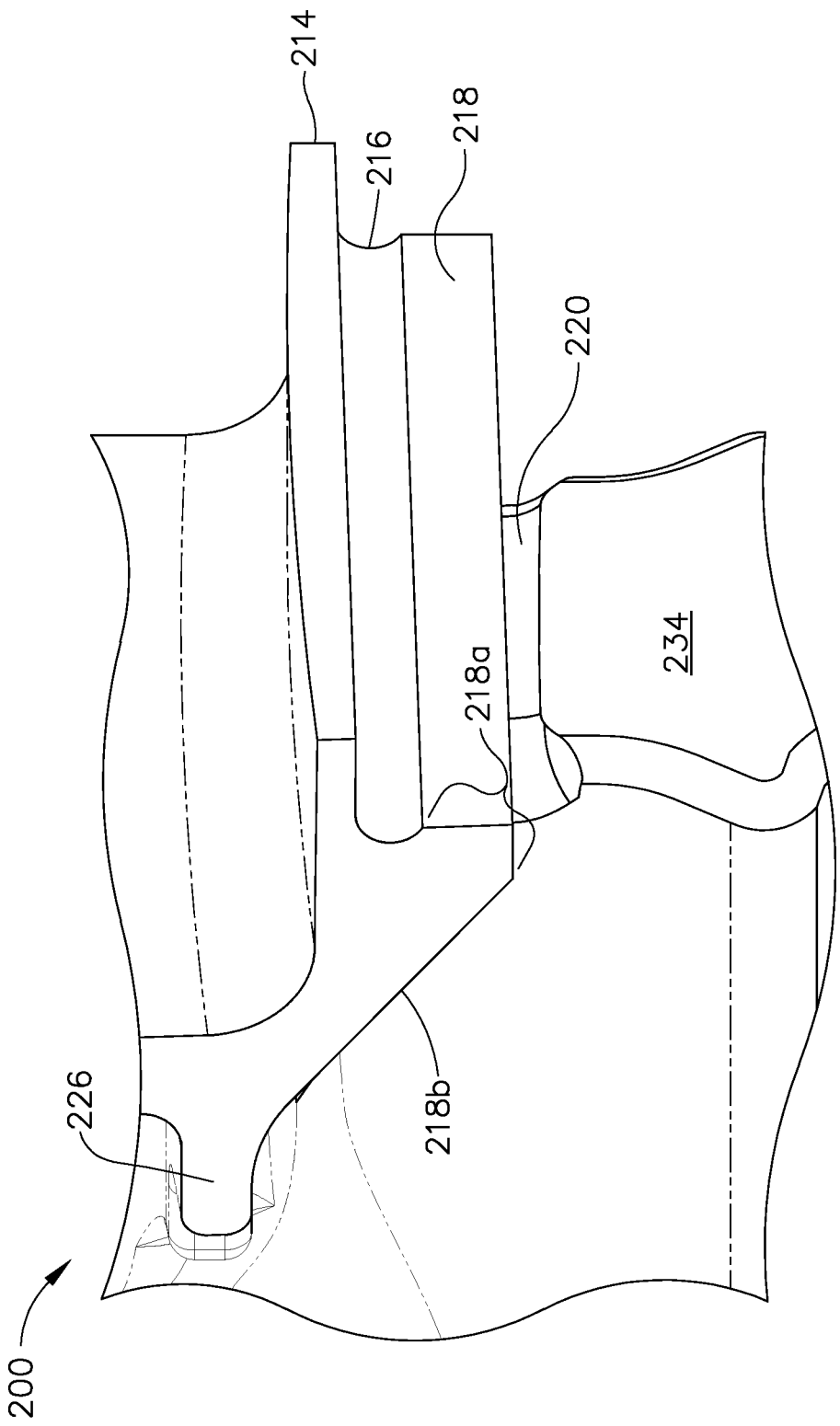
FIG. 7 is a side perspective of the blade depicted in FIG. 5, as viewed from an aft position.
Figure 8:
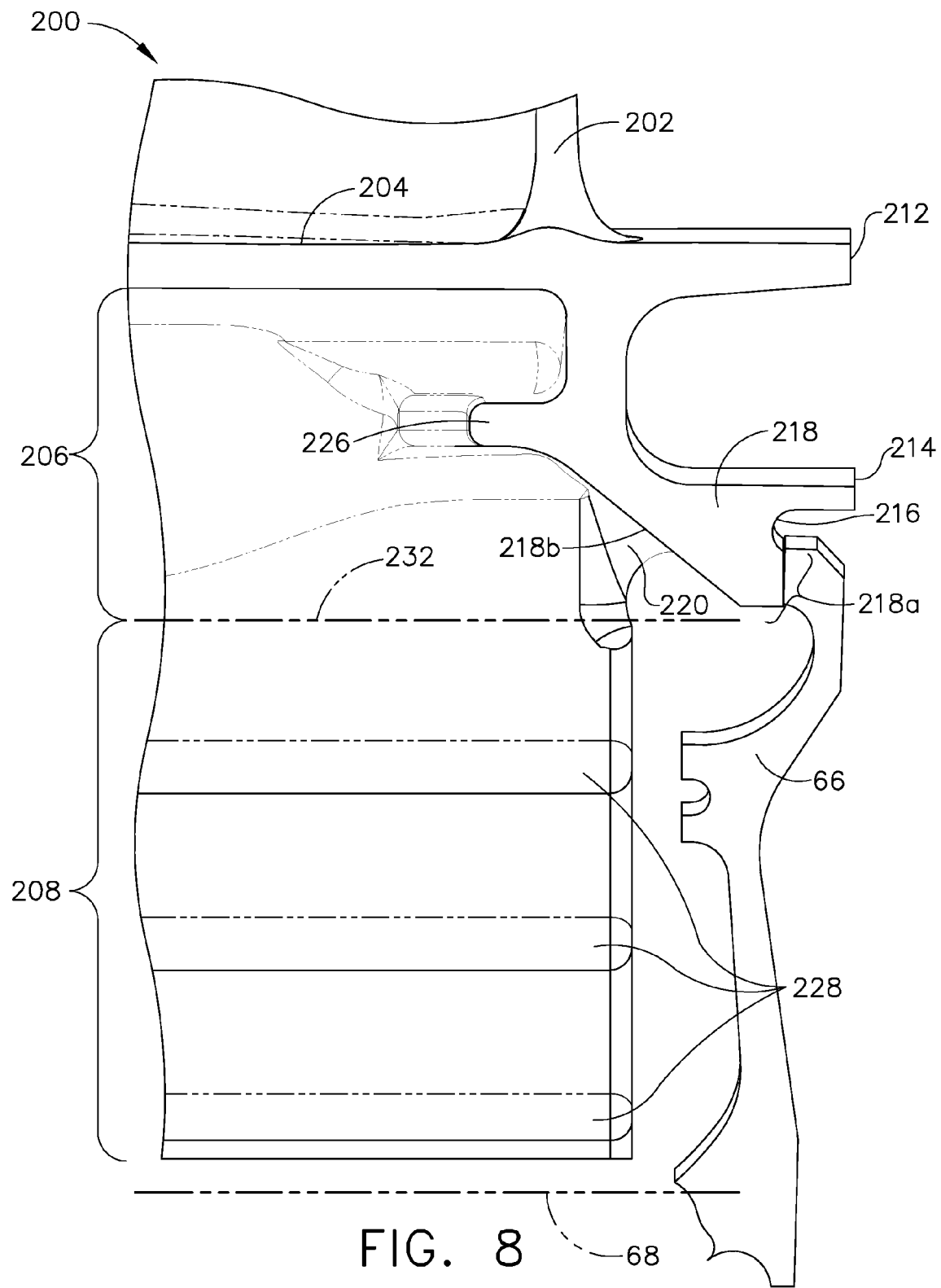
FIG. 8 is a side view of an aft portion of the blade depicted in FIG. 4 with the addition of showing the relative position of a retainer.

As shown in FIG. 7, the skirt 218 may extend across the shank 206 and laterally from either side of the shank 206. The skirt 218 may generally extend from one slash face of the blade 200 to the other slash face of the blade 200 generally uninterrupted. The skirt 218 may also have a generally constant cross-sectional geometry across its entire lateral length. Accordingly, the skirt end portion 218a does not blend into the blade aft surface 234.

A recess may be provided within the shank portion 206 between the forward and aft sides of the blade 200. This recess may be bound by the forward skirt 211 the aft skirt 218 and the platform. Within that recess, there may be a forward damper retention lug 224 and an aft damper retention lug 226, which are typically used in conjunction with one another to retain a damper (not shown). Transitioning between the shank 206 and dovetail 208 is an upper minimum neck designated by dashed line 232.

The dovetail section 208 may be inserted in a rotor 60 (See FIG. 1) such that the dovetail lobes 228 mate with the rotor to radially fix the blade in place. A retainer 66 is fixedly attached to the rotor 60 (See FIG. 1) in any known fashion, such as with a lock ring and rabbet assembly 64 (See FIG. 1). The retainer 66 extends radially distal from the rotor and abuts the aft skirt 218 so as to axially fix the blade 200 along the longitudinal axis 68 of the engine.

Figure 9:
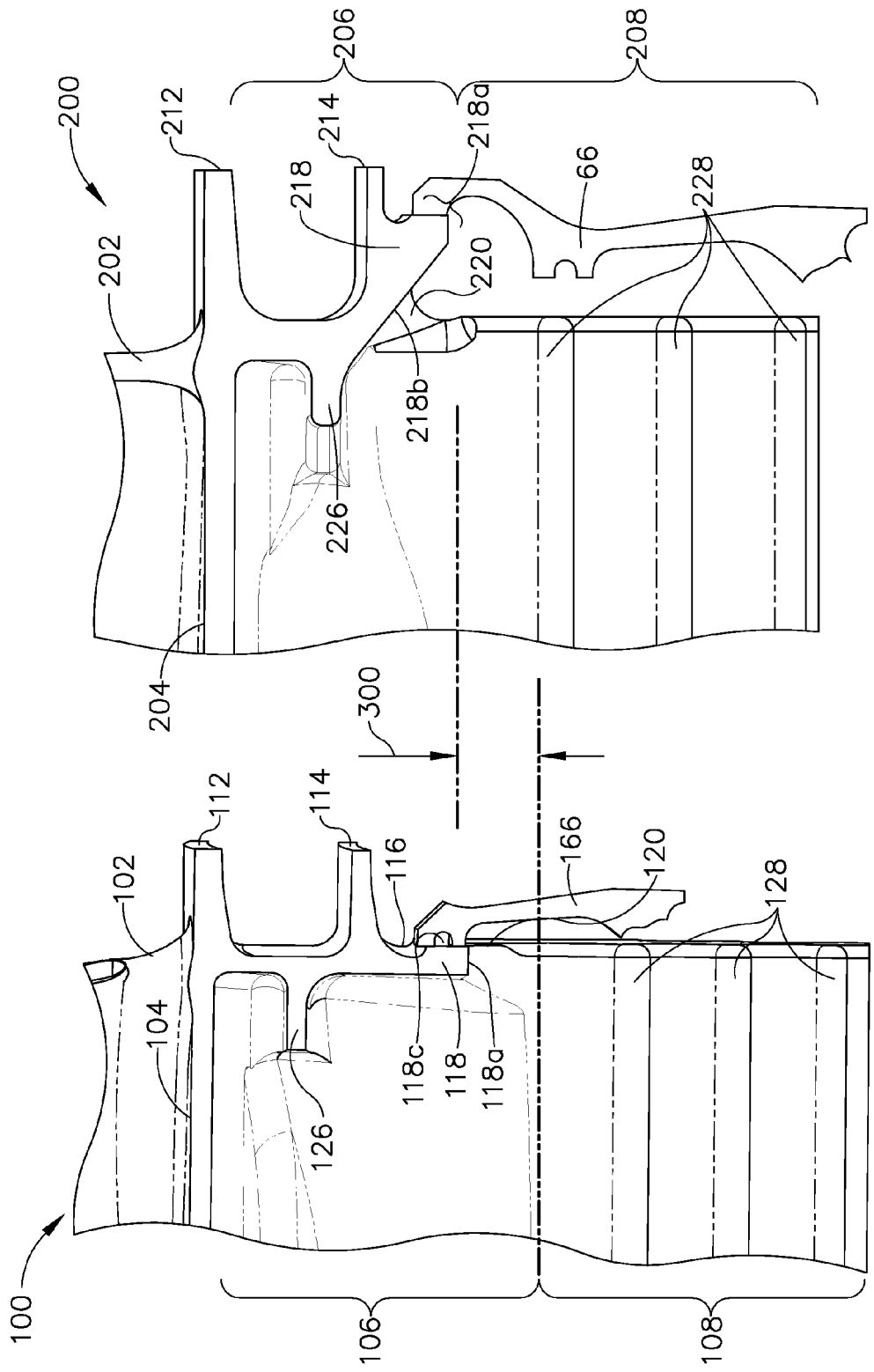
FIG. 9 is a side-by-side comparison of the blades depicted in both FIGS. 2 and 5. The embodiment shown in FIG. 1 is on the left and the embodiment shown in FIG. 5 is on the right.

Referring now to FIG. 9, a blade 100 of the prior art is compared to a blade 200 of an embodiment of the present invention. The top surface of the platform 204 of the blade 200 of the present invention is displayed level with the top of the platform 104 of the blade 100 of the prior art. The aft features (for example, distal aft angel wings 112, 212; proximal aft angel wing 114, 214; and skirt 118, 218) of the blades 100, 200 are stacked between the upper minimum neck 132, 232 and the platform 104, 204.

As can be seen, the aft skirt 218 of an embodiment of the present invention allows for a shorter stack of these aft features between the upper minimum neck 232 and the platform 204 as compared to a skirt 118 of the prior art. Thus, allowing for a shorter shank 206 as compared to a blade 100 of the prior art. This difference in size is shown by dimension 300, which spans the distance between the two upper minimum necks 132,232. Accordingly, a shorter shank portion 206 results in a reduced overall weight of a blade. It is believed that the total weight reduction of a typical blade may be 5% to 8%. However depending on design choices, this value may be greater or smaller.

A blade 200 according to one embodiment of the present invention may require a slightly longer retainer 66 as compared to a retainer of the prior art 166. However, the weight added to the retainer is substantially less than the weight reduced by the smaller shank 206 afforded by an embodiment of a blade skirt 218 of the present invention.

The reduced blade weight may also result in less stress on the rotating components that hold the blade 200, which improves their operational life and capabilities. Alternatively, rotor life may be maintained by reducing rotor sizes by removing material in components used in retaining the blade 200. This further reduces engine weight, which improves the overall efficiency of the turbine engine.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. The blade described herein has been generically referred to as a blade. However, the same or similar features may be applied to either compressor or turbine blades of a gas turbine engine. It is understood that while certain forms of a blade skirt have been illustrated and described, it is not limited thereto and instead will only be limited by the claims, appended hereto.

The invention claimed is:

1. A gas turbine engine blade comprising:
   a proximal end and a radially opposite distal end, and a forward side and an axially opposite aft side;
   an airfoil, a platform, a shank, and a dovetail;
   wherein said airfoil extends distally from said platform and terminates at said distal end, said shank extends proximally from said platform, and said dovetail extends proximally from said shank and terminates at said proximal end;
   a skirt disposed at least partially on an aft side of said shank and extending at least partially from said shank in a direction that is at least partially axially aft of said shank;
   wherein said skirt includes a skirt radius which serves as a transitioning surface between a proximal surface of said skirt and an aft surface of said shank and also between said aft surface of said shank and a lateral side of said shank.

2. The gas turbine engine blade of claim 1, wherein said skirt extends from said shank in a direction at least partially radially toward said proximal end.

3. The gas turbine engine blade of claim 1, wherein said skirt has a first skirt surface that faces axially toward said forward side and also faces radially toward said proximal end.

4. The gas turbine engine blade of claim 3, wherein said first skirt surface is disposed on a plane that is at an angle relative to said aft surface of said shank.

5. The gas turbine engine blade of claim 3, wherein said first skirt surface and said aft surface of said shank have a skirt radius disposed therebetween.

6. The gas turbine engine blade of claim 1 wherein said lateral side is a first lateral side and further comprising a laterally opposed second lateral side, wherein said skirt extends laterally from said first lateral side to said second lateral side.

7. The gas turbine engine blade of claim 1, wherein said skirt has an end portion extended away from and proud of said shank and uninterrupted across a lateral dimension of said skirt.

8. The gas turbine engine blade of claim 1, wherein said skirt has an end point at its radially proximal extreme that is disposed radially distally of a radially distal extreme of said dovetail.

9. A gas turbine engine blade comprising:
   a proximal end and a radially opposite distal end, and a forward side and an axially opposed aft side;

an airfoil, a platform, a shank, and a dovetail;

wherein said airfoil extends distally from said platform and terminates at said distal end, said shank extends proximally from said platform, and said dovetail extends proximally from said shank and terminates at said proximal end;

a skirt disposed on said aft side and at least partially extending from said aft side axially proud of an axially aft side surface of said shank;

wherein said skirt includes a skirt radius which serves as a transitioning surface between a proximal surface of said skirt and said axially aft side surface of said shank and also between said axially aft side surface of said shank and a lateral side of said shank.

10. The gas turbine engine blade of claim 9, wherein said skirt extends from said aft side in a direction at least partially radially toward said proximal end.

11. The gas turbine engine blade of claim 9, wherein said skirt has a first skirt surface facing axially toward said forward side and facing radially toward said proximal end.

12. The gas turbine engine blade of claim 11, wherein said first skirt surface extends from said aft side at an angle from said axially aft side surface of said shank.

13. The gas turbine engine blade of claim 11, wherein said first skirt surface and said axially aft side surface of said shank have said skirt radius therebetween.

14. The gas turbine engine blade of claim 9 wherein said lateral side is a first lateral side and further comprising a laterally opposed second lateral side, wherein said skirt extends laterally from said first lateral side to said second lateral side generally uninterrupted.

15. The gas turbine engine blade of claim 9, wherein said skirt has an end point at its radially proximal extreme that is disposed radially distally of a radially distally extreme of said dovetail.

16. The gas turbine engine blade of claim 9, wherein said skirt extends from said shank.

17. The gas turbine engine blade of claim 9, wherein said skirt extends from said platform.

18. A blade for a gas turbine engine comprising:

a forward end and an axially opposed aft end along a longitudinal axis, and radial axes extending from and perpendicular to said longitudinal axis, each of said radial axes having a proximal end at said longitudinal axis and a radially opposed distal end;

an airfoil, a platform, a shank, a dovetail, and a skirt;

wherein said airfoil extends radially distally from said platform along one of said radial axes, said shank extends radially proximally from said platform along one of said radial axes, and said dovetail extends radially proximally from said shank along one of said radial axes;

said skirt extending at least partially axially aft from said shank;

wherein said skirt includes a skirt radius which serves as a transitioning surface between a proximal surface of said skirt and an aft surface of said shank and also between said aft surface of said shank and a lateral side of said shank.

\* \* \* \* \*

UNITED STATES PATENT AND TRADEMARK OFFICE
CERTIFICATE OF CORRECTION

PATENT NO.       : 9,039,382 B2  
APPLICATION NO.  : 13/306413  
DATED            : May 26, 2015  
INVENTOR(S)      : Stapleton It is certified that error appears in the above-identified patent and that said Letters Patent is hereby corrected as shown below:

In Column 6, Line 50, in Claim 5, delete "have a" and insert -- have said --, therefor.

In Column 8, Line 3, in Claim 15, delete "distally extreme" and insert -- distal extreme --, therefor.

Signed and Sealed this  
Twenty-sixth Day of July, 2016

Michelle K. Lee  
*Director of the United States Patent and Trademark Office*